May 10, 1949.  W. L. RUSSELL  2,469,461
GAMMA RAY LOGGING
Filed Jan. 4, 1946  6 Sheets-Sheet 1
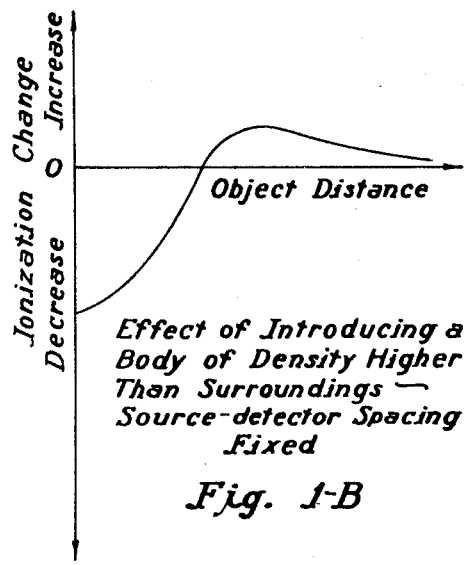
Effect of Introducing a Body of Density Higher Than Surroundings — Source-detector Spacing Fixed
Fig. 1-B
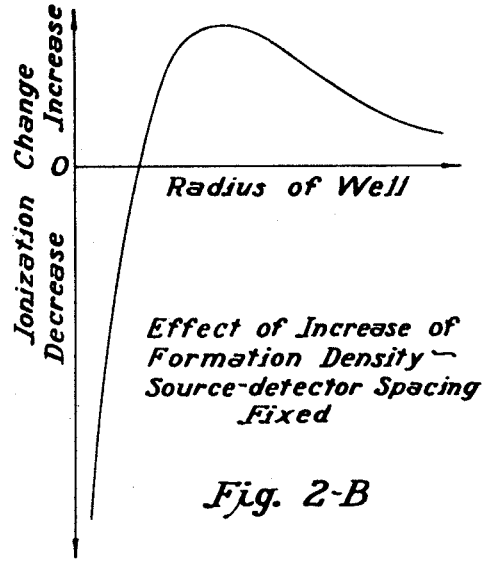
Effect of Increase of Formation Density — Source-detector Spacing Fixed
Fig. 2-B
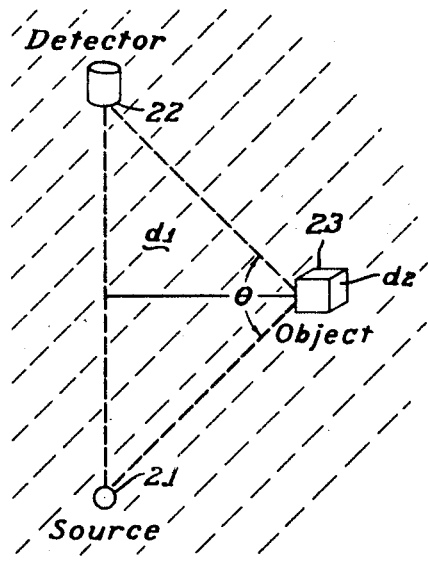
Fig. 1-A
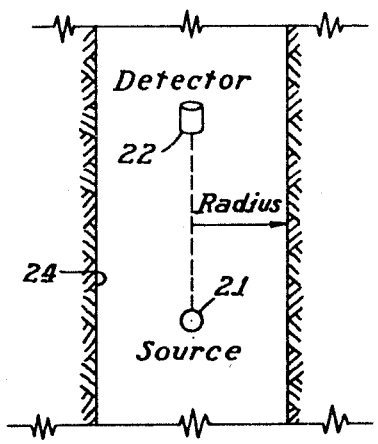
Fig. 2-A
INVENTOR:
William L. Russell
BY
Attorney May 10, 1949.  W. L. RUSSELL  2,469,461
GAMMA RAY LOGGING
Filed Jan. 4, 1946  6 Sheets-Sheet 2
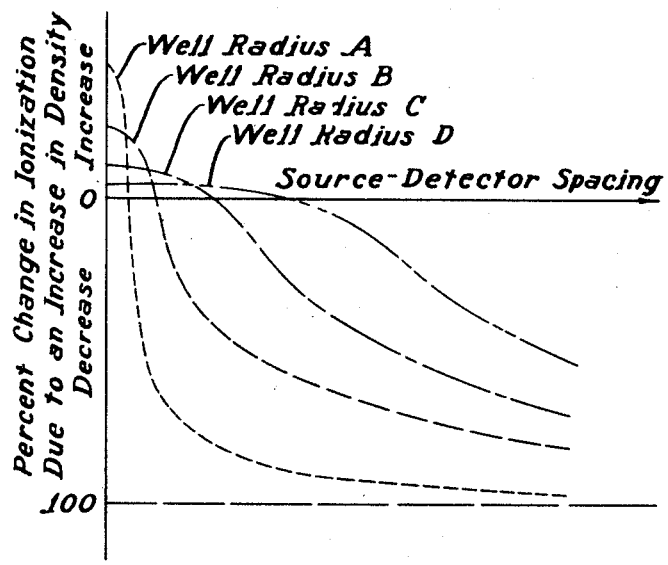
Fig. 2-C
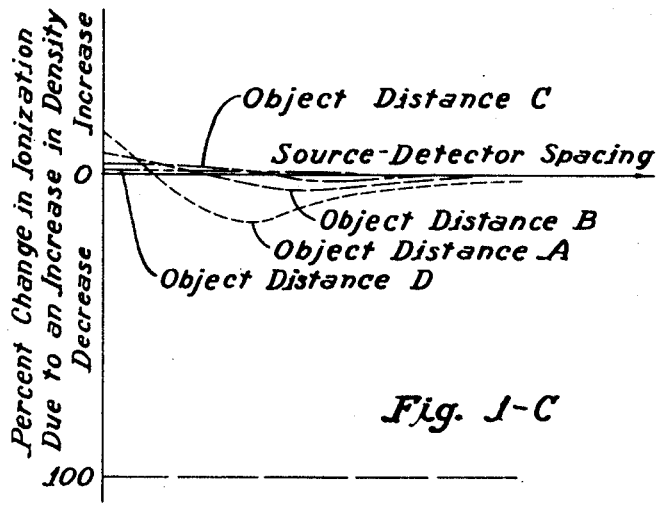
Fig. 1-C
INVENTOR:
William L. Russell
BY Newell Pottoff
Attorney May 10, 1949.  W. L. RUSSELL  2,469,461
GAMMA RAY LOGGING
Filed Jan. 4, 1946  6 Sheets-Sheet 3
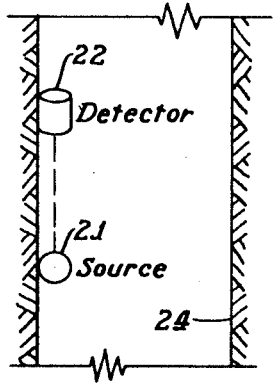
Fig. 3-A
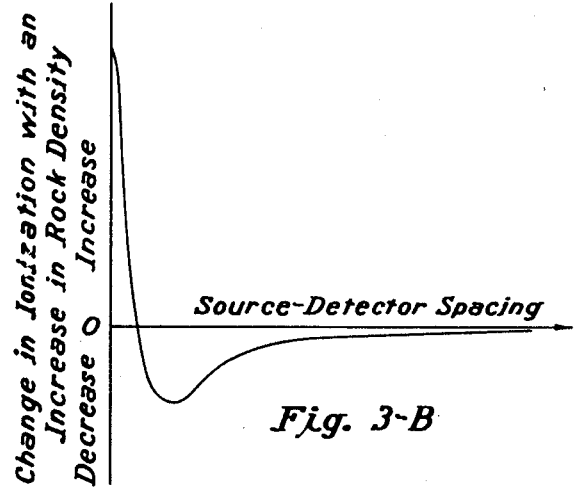
Fig. 3-B
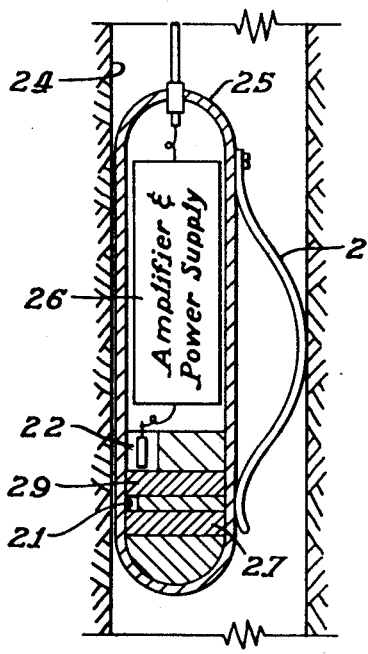
Fig. 4
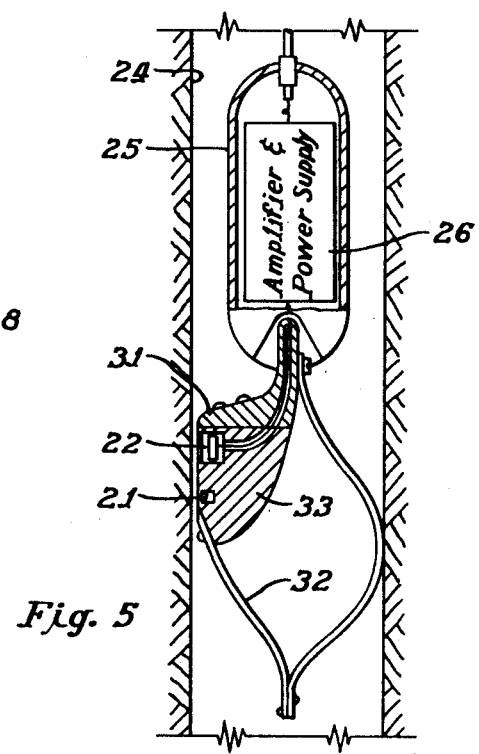
Fig. 5
INVENTOR:
William L. Russell
BY Newell Potter
Attorney May 10, 1949. W. L. RUSSELL 2,469,461
GAMMA RAY LOGGING
Filed Jan. 4, 1946 6 Sheets-Sheet 4
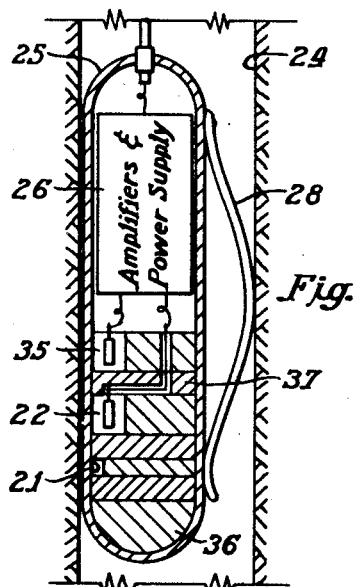
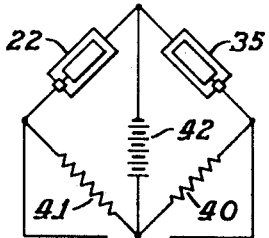
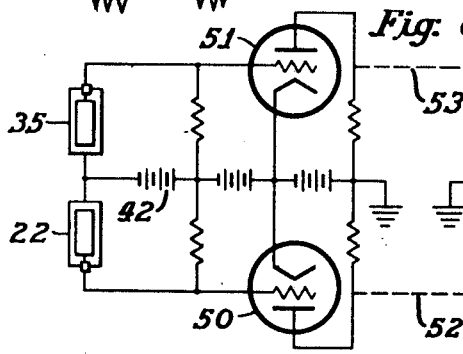
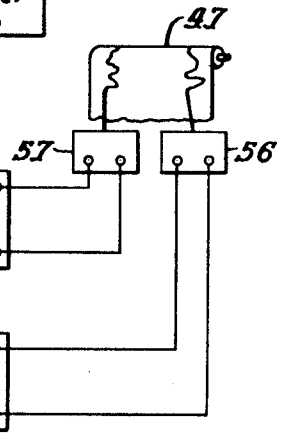
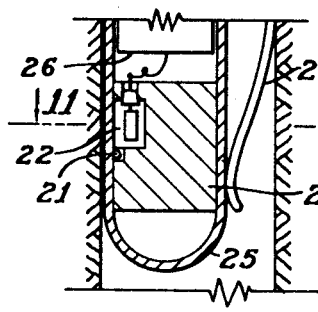
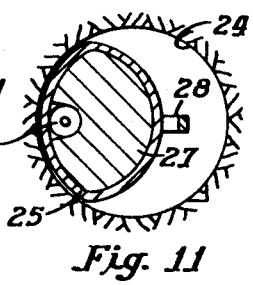
INVENTOR.
William L. Russell
BY Newell Pattory
Attorney INVENTOR:
William L. Russell
BY Newell Potter
Attorney May 10, 1949.    W. L. RUSSELL    2,469,461
GAMMA RAY LOGGING Filed Jan. 4, 1946    6 Sheets-Sheet 6

INVENTOR.
William L. Russell
BY Newell Pottoy
Attorney

Patented May 10, 1949

2,469,461

UNITED STATES PATENT OFFICE 2,469,461

GAMMA-RAY LOGGING

William L. Russell, Tulsa, Okla., assignor to Stanolind Oil and Gas Company, Tulsa, Okla., a corporation of Delaware Application January 4, 1946, Serial No. 638,996

8 Claims. (Cl. 250—83.3)

This invention relates to the logging of wells and is directed particularly to that method of logging in which the well formations are irradiated by a source of gamma rays, and the varying ability of these formations to absorb and scatter the rays is measured.

Out of the various phenomena associated with atomic nuclei only two commercial applications have so far been widely accepted for use in logging wells and similar purposes. The first and most widely used application of nuclear physics has been the development of natural radioactivity logging in which the gamma radiation emitted from well formations, nearly all of which contain differing but extremely small amounts of radioactive matter, is detected and measured. The other and more recent application of nuclear physics has been the neutron logging process in which the scattering and slowing down of neutrons from a source passed through a well is detected and recorded. Aside from these two processes no other important applications of nuclear physics have so far been commercially developed despite the fact that some of them appear to be capable of yielding highly useful information.

In particular, it would appear that a log of the ability of well formations to scatter and absorb gamma rays from a concentrated source should be especially useful. However, so far as is known, all attempts heretofore made to develop commercially this method of logging have resulted in failure. Consequently the logging of wells by gamma-ray scattering and absorption has been neglected in favor of further improving the natural radioactivity and the neutron logging processes, the value of which has been demonstrated.

Heretofore the distinctions between the scattering of neutrons and the scattering of gamma rays have often not been clearly drawn. In most instances prior inventors have apparently considered the similarities more important than the differences, which attitude has undoubtedly retarded the development of satisfactory methods of logging by gamma-ray scattering. However, it should be emphasized that the processes involved in the scattering of gamma rays and of neutrons are quite different. Because of their lack of electrical charge neutrons in traversing matter interact chiefly by elastic collision with the nuclei of the atoms composing that matter, whereas the interaction of gamma rays is very seldom with a nucleus but is almost exclusively confined to the extra-nuclear electrons of those atoms.

Well logs of the variations in scattered gamma-ray intensity are affected only by the formation density and the geometry of the source-formation-detector system, and a system having an unvarying geometry is affected only by changes in density. On the other hand, a well log of scattered neutrons is sensitive not only to density and geometry, but is even more highly sensitive to the slowing down of fast neutrons by hydrogen and other light elements. Neutron logs are also influenced by the cross-sections of the elements to slow neutrons (i. e., the power of the atoms of various substances to absorb slow neutrons) and the resonance cross-sections of certain elements for faster neutrons. Because of the complexity in compositions of ordinary rocks, and also because of their varying porosity and hydrogen content, the interpretation of logs produced by measuring scattered neutrons for the purpose of determining rock densities is so difficult as to be quite impractical. Being relatively free of such overlapping effects as these, scattered gamma-ray logs are interpreted in terms of density with comparative ease.

Density logs of wells have a number of very important uses. For example, such logs of test holes and wells are extremely valuable for correlation purposes. The interpretation of seismograph and gravity meter data is considerably improved by density logs revealing some of the major changes in lithology. Since rock densities are often closely associated with seismic wave-transmitting properties, it is apparent that a knowledge of the depths at which density changes occur is highly valuable in predicting where major reflections should occur in seismic prospecting. In the interpretation of gravity meter data a knowledge of the depth and extent of formations having densities contrasting with neighboring formations helps in overcoming that lack of depth resolution which limits the gravimetric prospecting method as used at present. In wells where from samples or cuttings the lithologic nature of the formations is known, then the variations in a density log of these formations may be interpreted in terms of porosity values. Another application of density logs is in the interpretation of neutron logging in which porous gas sands are often misinterpreted as non-porous rock due to the relatively smaller hydrogen concentration than when the pores are filled with liquid. A sufficiently accurate indication of density makes it possible to distinguish such a porous gas sand from a non-porous rock. Gamma-ray scattering measurements of density also find application in locating the top of cement behind a well casing.

Apparatus for making such logs is also useful in measuring depths in wells by counting casing joints, and by proper apparatus design variations in the diameter of an open hole may be indicated. Because of the fact that a much larger radiation intensity is available than in natural radioactivity logging, logging speeds may be greatly increased even though a quite small detector is employed. Among other advantages incident to a detector of small size are a correspondingly small time lag and increased resolving power for thin formations.

It is accordingly a primary object of my invention to provide an improved method and apparatus for logging walls by the scattering and absorption of gamma rays. Another object is to provide a method and apparatus of this type suitable for use in test holes of small diameter and for making logs for correlation purposes. A further object is to provide a method and apparatus for determining formation densities or changes in formation densities in wells. A still further object is to provide a method of gamma-ray well logging having a depth of investigation which is small but may be varied to suit different well conditions. Still another object is to provide such a method and apparatus capable of logging wells and with great speed and accuracy. A still further object is to provide a method and apparatus of this type having increased sensitivity to changes in formation density. Still another object is to provide for the use of a very small source of radiation which is so inexpensive that it may be abandoned and need not be recovered at great cost if accidentally lost. An even further object is to provide a method and apparatus capable of locating with great accuracy the interfaces between strata of different density. Another and more specific object is to improve the determination of the dip of strata by measurements in a single well. Other objects, uses, and advantages of this invention will become apparent as the description thereof proceeds.

In general, the observable effect of the interaction between gamma rays and the material through which they pass is a combination of absorption and scattering by this material. While these two phenomena are affected chiefly by the density of the material, the measurement of them is also affected strongly by the arrangement of the source and detector with respect to the material. In other words, the sensitivity to a given change in density varies markedly with different geometrical source-detector-object relations. For example, as the perpendicular distance of a dense from the midpoint of an imaginary line connecting a source and a detector of gamma rays increases, it will be observed that the portion of the detector response due to scattering increases, while that due to absorption decreases. As the total response is a combination of the two, it will be found that there is one distance at which a change in density of the object produces zero effect at the detector due to the fact that the increase due to scattering is exactly offset by the decrease due to absorption. In other words, this distance is insensitive for the purpose of measuring density and must be avoided. This is the reason why only certain configurations of source, detector, and well formations are effective for well logging, and the interpretation of the logs obtained is dependent on the particular configuration used.

Also important to be kept in mind is the fact that the depth of investigation for well formations, while it varies somewhat with the average hardness of the gamma rays, is in general quite shallow. In fact, it appears that for gamma rays of the hardness of those of radium and its products and for most well formations nearly one-half of the total effect produced at the detector comes from the material within about one inch of the detector. This means that for effective density logging of the formations in a well both the source and detector must be kept close to these formations. Hence there should be no casing in the hole in which a density log of the formations is to be made, and it is found that roughness of the hole wall causes minor variations. It is observed also that the greatest sensitivity to density changes occurs with close source-detector spacings, and the increased sensitivity attained by employing such spacings permits the size of the detector to be reduced. This closer spacing is preferably achieved by reducing the thickness of the shielding ordinarily used between the source and detector for preventing gamma rays reading the detector directly from the source without having traversed the well formations. I have found, in fact, that a preferred arrangement of source and detector is one in which no shield is used at all, and the source is mounted directly on the wall of the detector.

These principles and their application in my invention will be more fully understood by reference to the accompanying drawings forming a part of this application for purposes of illustration. In these drawings, in which the same reference numeral in different figures refers to the same or a corresponding part:

Figures 1—A, 1—B, and 1—C are, respectively, an arrangement of a source and detector of gamma radiation with respect to a dense object, and graphs of the effects produced by varying certain spacings and distances;

Figures 2—A, 2—B, and 2—C are, respectively, a diagrammatic representation of a source and detector in a well, and graphs of the effects of varying the well radius and the spacing of the source and detector;

Figures 3—A and 3—B are, respectively, a diagrammatic representation of the placement of a source and detector against the wall of a well, and a graph of the effect produced as the source-detector spacing is varied;

Figure 4 is a cross section of a well and logging instrument therein embodying certain principles of the invention;

Figure 5 is a cross section of a well showing a mounting of the source and detector alternative to that of Figure 4;

Figure 6 is a cross section of a well showing an instrument therein using a plurality of detectors at different spacings;

Figure 7 is a wiring diagram suitable for use with the instrument of Figure 6;

Figure 8 is a wiring diagram alternative to that of Figure 7;

Figure 9 is a wiring diagram showing an alternate method of recording the output of the amplifiers shown in Figure 8;

Figure 10 is a cross section of part of an alternative form of instrument in a well;

Figure 11 is a cross section of Figure 10 on the line 11—11;

Figure 12:
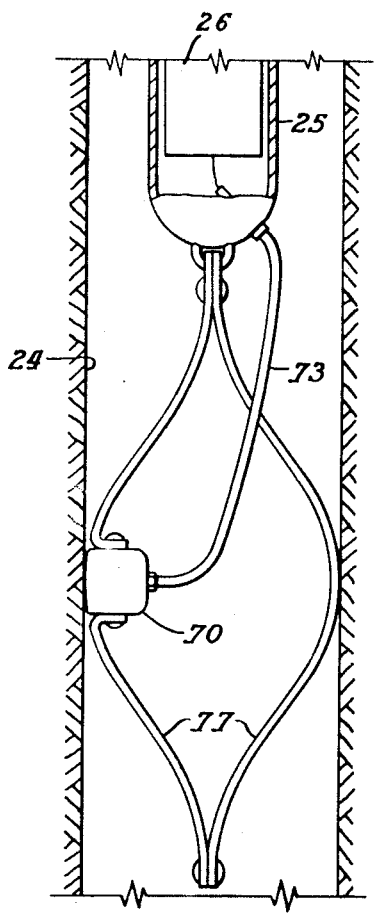
Figure 12 is a cross section of a well showing the use of a preferred form of source and detector therein.

Referring now to Figure 1—A, assume that a source of gamma radiation 21 and a detector of radiation 22 spaced therefrom are surrounded by a medium of density $d_1$. Then if an object 23 of density $d_2$ greater than $d_1$ is introduced, both the absorption and the scattering of gamma rays from source 21 will be increased. Which one predominates depends on the angle $\theta$ subtended at the object 23 by imaginary lines extending respectively to source 21 and detector 22. Stated differently, whether scattering or absorption predominates depends both upon the distance of object 23 from the line connecting source 21 and detector 22 and upon the spacing of detector 22 from source 21. As used herein, the term "object distance" is to be taken as the perpendicular distance from the mid-point of the source-detector line, as shown in this figure.

For a fixed source-detector spacing and small object distances the ionization change, as shown by Figure 1—B, is at first a relatively large decrease corresponding with the predominance of absorption. As the distance of object 23 is increased, this decrease diminishes toward zero, and the total effect finally becomes positive corresponding to the predominance of scattering. At a large distance the effect of this dense object again approaches zero. The significant features to be noted are that for this fixed spacing the smallest object distance produces the largest effect, and there is one object distance at which changes of density produce no effect whatever at the detector.

In Figure 1—C the effect of varying the source-detector spacing for certain fixed object distances is shown. Object distance A corresponds with the closest position of object 23, while D is the farthest away from the line connecting source 21 and detector 22. Here it is evident that the largest percentage ionization changes due to a given density increase occur at the smallest object distance A. Also it may be noted that for each object distance there is one critical spacing of the source and detector at which the ionization change becomes zero. In general this critical spacing increases with the increase in object distance. In addition, it will be evident that only for very small spacings of source and detector do objects at the distances assumed consistently produce an ionization increase; for intermediate and large spacings the effect of objects at different distances can be either an increase, a decrease, or zero.

The arrangement of source 21 and detector 22 in a well 24 for logging the formation density is shown in Figure 2—A. If the source-detector spacing be fixed, then for a given increase of formation density in wells of various radii the change in ionization produced thereby is shown in Figure 2—B. For a very small well radius it is apparent that the effect of absorption predominates producing a decrease in ionization. For only a relatively slight increase in well radius this change becomes zero and then reverses itself becoming an increase corresponding to the predominance of scattering. As with Figure 1—B, it is to be noted here also that the curve crosses the zero axis, there being thus at this detector spacing one well radius at which density changes are undetectable. Obviously it is necessary to avoid this combination of well radius and source-detector spacing in designing a logging instrument.

Figure 2—C shows the converse of this arrangement in which the spacing of the source and detector is varied for four fixed well radii. Radius A corresponds to the smallest well radius, while D is the largest. It will be apparent that for a very small source-detector spacing the increase of ionization accompanying a density increase indicates that the effect of scattering is larger, whereas for a large source-detector spacing and the same well radius absorption predominates. There is a considerable intermediate range of spacings where a density increase at one well radius produces a positive effect while at another it produces a strongly negative one. Only at quite small spacings is there consistently an increase of ionization for all radii shown at the same time there is reasonable sensitivity to density changes.

Because of the large variations arising from different well radii, a source-detector arrangement such as that shown in Figure 3—A is a practical necessity to successful logging. Here the effect of varying the well diameter is practically eliminated by placing the source and detector against the wall. As shown in Figure 3—B, for a very small source-detector spacing the ionization change is a quite large increase corresponding with large scattering. At a still relatively small critical spacing this effect becomes zero and then becomes a decrease, corresponding to the predominance of absorption. It is believed clear that when employing a detector 22 of finite length, it should be placed either so that the entire volume of the detector is less than the critical spacing at which this zero occurs, or so that the entire volume is at a spacing greater than this. If an elongated detector is used, or if it is so placed that this zero point occurs within the detector volume, then its effectiveness is seriously interfered with, since an ionization increase in one part due to a given density change is partially or entirely offset by the decrease occcurring simultaneously in another part of the detector volume.

These principles are followed in the design of the well logging instrument shown in Figure 4. Here the source 21 and detector 22, which may be of any suitable type such as a counter or ionization chamber, are preferably enclosed within a sealed, pressure-tight container or housing 25, which may also house the amplifier and power supply 26 commonly used with detectors of this type. In order to reduce the effect of the scattering from the well fluids surrounding the instrument both the source and detector are partly surrounded by lead shielding 27, the source and detector being placed against one side of housing 25, which side is pressed firmly against the wall of well 24 by a spring 28. Only a relatively small thickness of lead shielding 29 is interposed between the source 21 and detector 22. In this way are assured the close spacings between the formations and the source and detector shown above to be highly desirable.

As roughness of the walls of the hole may at times prevent the instrument from maintaining the desired close contact therewith, it is often found preferable to mount the source and detector as shown in Figure 5, on an arm 31 which is pivoted to instrument housing 25 and pressed against the wall of well 24 by springs 32. Source 21 and detector 22 are placed in the lead block 33 secured to the end of arm 31 and are slightly separated by intervening lead shielding as in the case of Figure 4. With this arrangement the source and detector can better follow small irregularities of the wall of the hole 24. Detector 22 also is made small for the reason pointed out in the discussion of Figure 3—B, so that no part of its volume includes the critical source-detector spacing at which density changes produce no effect.

Additional information is obtained by use of the arrangement shown in Figure 6 in which, in addition to the source 21 and detector 22 at the short spacing, a second detector 35 is used. This second detector is spaced from source 21 so that its entire volume is outside of the critical source-detector spacing shown in Figure 3—B. Lead blocks 36 of varying thickness may be used both to cut off direct radiation from source 21 and to reduce absorption and scattering in the bore hole fluids. A certain amount of control of the depth of investigation may be attained by choice of the thickness of the block 37 thereby changing the spacing of detector 35, since the larger this spacing is made, the greater is the amount of formation which has been traversed by those rays from source 21 which reach detector 35. This instrument is similarly pressed against the wall of the well 24 by spring 28, there being no shielding other than that of the instrument case between the detectors and the formation. It should be noted also that with this arrangement there is an increased sensitivity to changes in density for the reason that when one detector undergoes an increase the other receives a decreased amount of radiation and vice versa, and combining the two outputs to produce a single indication tends to increase accuracy by smoothing out random fluctuations.

Of many suitable circuits it will be found convenient to connect these two detectors in two adjacent arms of a bridge circuit such as that shown in Figure 7, in which resistors 40 and 41 make up the other two arms of the bridge. The bridge potential is supplied by a battery 42 or other suitable source connected across one diagonal of the bridge. The unbalance output voltage of the bridge appearing across the other diagonal is amplified by an amplifier 43 and transmitted over insulated cable 44 to the surface of the ground, where the signal may be further amplified if necessary by an amplifier 45 and recorded by a pen or other recorder 46 on a moving chart 47 in a fashion well known in well logging. It will be seen that this arrangement produces only a single trace which varies with the density of the well formations. An important advantage of the circuit is that only the changes in ionization will unbalance the bridge, any background current in the detectors being balanced out initially.

For some purposes it may be preferable to employ a circuit like that of Figure 8, in which the output of each detector is separately amplified as by means of vacuum tubes 50 and 51, and the two resulting signals are transmitted to the surface over separate insulated conductors 52 and 53. After amplification by amplifiers 54 and 55 at the surface the output of detectors 22 and 35 may be recorded on the chart 47 by separate recording devices 56 and 57. The record so produced is useful when, for any reason, it is desired to have logs corresponding to two somewhat different depths of penetration.

In still other cases it may be preferred to record the output of amplifiers 54 and 55 as a ratio rather than as separate traces. This may be done as shown in Figure 9 by impressing on the crossed coils 60 and 61, in the field of a magnet 62, the respective outputs of amplifiers 54 and 55. This arrangement, it will be recognized, corresponds to a recording ratiometer, and the trace so recorded is a partially sensitive indicator of density changes due to the fact that the output of one detector always shifts in the opposite direction to the other. It will be apparent that a single amplifier channel and recorder circuit such as is used in the bridge circuit of Figure 7 may be adapted for use with a single detector unit such as is illustrated in Figures 4 and 5.

In Figures 10 and 11 I have shown an arrangement of source and detector in which the sensitivity to changes of formation density is much greater than the previous embodiments where the source and detector are separated by shielding material. Here a very close source-detector spacing is obtained by entirely omitting all shielding material and placing source 21 practically in contact with detector 22. Both are surrounded by the lead block 27 to reduce scattering from the bore hole fluids. As shown by Figure 11 the outside of instrument case 25 is rounded to conform to the shape of the hole in order to exclude as much fluid as possible from the volume investigated by this source and detector arrangement. Lead shield 27 is cut away so as to leave the space between detector 22 and the formation immediately outside the rounded portion of the instrument case 25 open for transmission of scattered gamma rays. Although not previously mentioned, all the various source-detector assemblies described herein, whether enclosed within a housing or mounted on an arm should be shaped in this manner to make as close contact as possible with the formation to be logged. In the present embodiment the dimensions of detector 22 may be made quite small because of the large effect of formation density variations at this close spacing. Although the gamma rays transmitted directly from source 21 to detector 22 will constitute the major portion of the gamma rays detected, these will produce a constant reading and may be subtracted or balanced out, leaving only the variations arising from the changing formation density to be recorded. One method of accomplishing this is to make detector 22 one arm of a bridge circuit similar to that of Figure 7, the other three arms being fixed or adjustable resistances.

Figure 13:
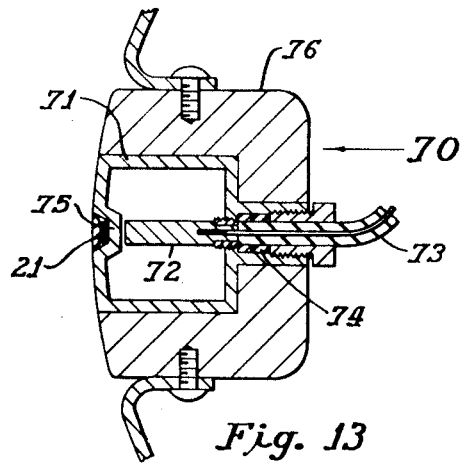
Figure 13 is a detailed cross section of the preferred form of source and detector.

In Figure 12 is shown a preferred form of source and small detector unit 70 which is even more sensitive to density variations than the embodiment just described. As shown in more detail by Figure 13 this small detector consists of an ionization chamber having concentric cylindrical electrodes 71 and 72 and filled to a high pressure with a suitable inert gas such as argon. By the term "small" is meant less than a few cubic inches filled with gas in which ionization is produced. If a counter-type detector is employed, the size can be even much smaller than one cubic inch, for units have been designed and used in radiation therapy that are exceedingly minute. The connection to the electrode 72 is by means of an insulated wire 73 brought in through a fluid-tight packing 74. The source 21 of gamma rays is contained in an indentation 75 on the side of the ionization chamber facing the wall of the well. Except for the portion in contact with the formations, this source and detector unit is surrounded by a lead shield 76, and the entire assembly is pressed against the wall of the well by springs 77. The insulated lead 73 connects the detector with the power supply and amplifier 26 in the instrument casing 25, to which springs 77 are attached by a flexible linkage so as to permit free movement of the detector unit 70 in adapting itself to the wall of the hole. Fluctuations due to roughness of the hole wall are reduced by slightly rounding or pointing the portion of the source-detector unit pressed against it. It will be apparent that this arrangement is capable of very closely following the outline of the hole and will be quite sensitive to density changes, since the effective spacings between the source and the detector and the formations are all about as small as can be achieved.

Figure 14:
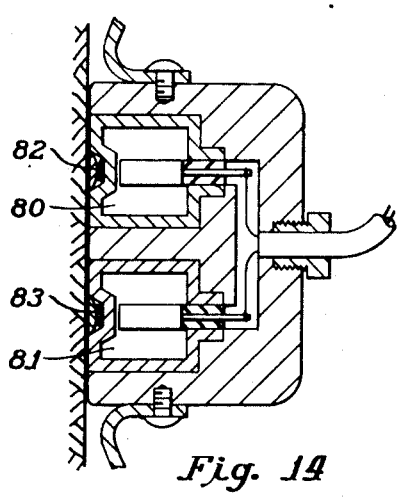
Figure 14 is a cross section showing a unit formed of a pair of the preferred detectors.

Figure 14 shows a unit consisting of two detectors 80 and 81, each with a separate source 82 and 83, respectively. This is especially suited to locating the interfaces between formations of different density. Preferably these two detectors are connected in a differential or bridge circuit like that of Figure 7, which is balanced when the formation density opposite both detectors is the same and unbalanced only when the formation opposite one is different from that opposite the other of the detectors. Because of the very small size and close spacing of these detectors, together with their great sensitivity to density changes, the interfaces between formations even of very small difference in density are easily and accurately located.

Figure 15:
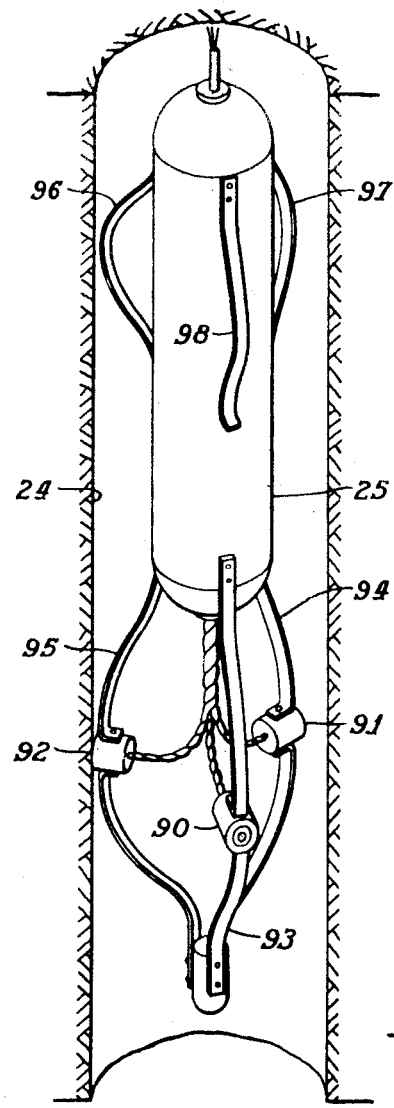
Figure 15 is a cross section of a well showing suspended therein an instrument for measuring the dip of the well formations.

In Figure 15 I have shown how these preferred source-detector units may be adapted to the determination of dip in one well. In this case three such units 90, 91, 92 would be placed on spring arms 93, 94, 95 and spaced 120° apart around a circumference of the hole. The instrument case 25, to which springs 93, 94, 95 are attached, would be held in the center of the well by these springs and by another set of centralizing springs 96, 97, 98. In addition to the usual power supply and amplifiers for detectors 90, 91, 92 housing 25 would also include means well known in the art for determining the inclination of well 24 and the orientation of the detectors. Such means are shown, for example, in U. S. Patent 2,176,169 to H. G. Doll. From the small differences in depth at which the various detectors 90, 91, 92 pass an interface as the instrument is moved through the well, as determined from the three separately recorded logs, the dip of formations can be readily computed. Because of their small size these source-detector units are far superior to any other type of known radio-activity or neutron logging instrument for locating these interfaces. In other words, if an ordinary radioactivity detector were made small enough to pass entirely from one formation to the next one adjacent in a very small vertical distance, its sensitivity would be so small that obtaining readings would be very difficult and would require a very long period of time. Because of the very much larger signal received by this scattered gamma-ray detector, the time required for it to respond to density changes is not great even though the volume of the detector is quite small. It is believed apparent from the foregoing description that the type of differential interface locating unit shown in Figure 14 could be used in place of the single detectors 90, 91, 92 for locating interfaces directly, rather than indirectly as in Figure 15.

It will be apparent that in this invention I have provided source and detector arrangements for gamma-ray well logging which possess numerous advantages over those previously tried without success. This invention has taken advantage of the fact that the depth of investigation of scattered gamma rays is very shallow, and for that reason is particularly adapted to the type of logging herein set forth. As numerous modifications and variations of this method and apparatus will occur to those skilled in the art, it is to be understood that the invention is not limited to the exact details of the apparatus described, but is to be defined by the scope of the following claims.

I claim:

1. The method of gamma ray well logging comprising the steps of passing through a well a source and a detector of gamma rays, said source and detector being substantially in contact with each other, maintaining said source and detector substantially in contact with the formations exposed by said well, and indicating the response of said detector as a function of depth in said well.

2. Apparatus for logging wells comprising a source and a detector of gamma rays adapted to be passed through a well, said detector being spaced from said source by a small distance which is less than the distance at which formation density variations in said well produce zero response at said detector when said source and detector are substantially in contact with the formation, means for forcing said source and detector substantially into contact with the formations exposed by said well, and means for indicating the response of said detector as a function of depth in said well.

3. Apparatus for logging wells comprising a source and two detectors of gamma rays adapted to be passed through a well, said detectors having substantially similar frequency responses, one of said detectors being spaced from said source by a small distance which is less and the other by a distance greater than the distance at which formation density variations in said well produce zero response at a detector when said source and detectors are substantially in contact with the formation, means for forcing said source and detectors substantially into contact with the formations exposed by said well, and means for indicating the outputs of said detectors as a function of depth in said well.

4. Apparatus for logging wells according to claim 3 in which said indicating means produces the ratio of the outputs of said detectors as a function of depth in said well.

5. Apparatus for logging wells comprising a source and two detectors of gamma rays adapted to be passed through a well, said detectors having substantially similar frequency responses, one of said detectors being spaced from said source by a small distance which is less and the other by a distance greater than the distance at which formation density changes in said well produce zero response at a detector when said source and detectors are substantially in contact with said formation, and each of said detectors being included in the adjacent arms of an electrical bridge circuit, means for maintaining said source and detectors substantially in contact with the formations exposed by said well, and means for indicating the output of said bridge circuit as a function of depth in said well.

6. Apparatus for logging wells comprising a source and a detector of gamma rays adapted to be passed through a well, means for maintaining one wall of said detector in contact with the formations exposed by said well, said source being mounted in said wall and substantially in contact with both said formations and said detector, and means for indicating the response of said detector as a function of depth in said well.

7. Apparatus for logging wells comprising a pair of vertically spaced gamma ray detectors adapted to be passed through a well, means for maintaining a wall of each of said detectors in contact with the formations exposed by said well, a source of gamma rays in said wall of each detector substantially in contact with both said detector and said formations, and means for indicating the difference in the response of said detectors as a function of depth in said well.

8. Apparatus for logging wells comprising at least three gamma ray detectors adapted to be passed through a well and spaced in different azimuthal positions around a circumference of said well, means for maintaining a wall of each of said detectors in close contact with the formations exposed by said well, a source of gamma rays in said wall of each detector substantially in contact with both said formations and said detector, means for determining the azimuthal orientation of each of said detectors with respect to a given direction, and means for indicating the response of each of said detectors as a function of depth in said well.

WILLIAM L. RUSSELL.

REFERENCES CITED

The following references are of record in the file of this patent:

UNITED STATES PATENTS

| Number | Name | Date |
| --- | --- | --- |
| 2,296,176 | Neufeld | Sept. 15, 1942 |
| 2,322,634 | Howell | June 22, 1943 |
| 2,323,484 | Neufeld | July 6, 1943 |
| 2,332,873 | Silverman | Oct. 26, 1943 |
| 2,353,619 | Pontecorvo et al. | July 11, 1944 |
| 2,369,672 | Hare | Feb. 20, 1945 |